United States Patent

Lucht

[11] Patent Number: 6,139,249
[45] Date of Patent: Oct. 31, 2000

[54] TRUCK BOX RAMP

[76] Inventor: Duane W. Lucht, 2254 Knowles Avenue, Winn Ipeg, Manitoba, Canada, R2G 2K6

[21] Appl. No.: 09/399,316

[22] Filed: Sep. 20, 1999

[51] Int. Cl.⁷ .................................................. B65G 67/02
[52] U.S. Cl. ........................... 414/537; 14/69.5; 182/151; 296/61; 193/41
[58] Field of Search .............................. 414/537; 193/41; 182/151; 296/61; 14/69.5, 71.1

[56] References Cited

U.S. PATENT DOCUMENTS

| | | | |
|---|---|---|---|
| 4,060,150 | 11/1977 | Hughes | 182/151 |
| 4,086,980 | 5/1978 | Shortes et al. | 182/151 |
| 5,440,773 | 8/1995 | Lentini | 14/69.5 |
| 5,538,308 | 7/1996 | Floe | 414/537 X |
| 5,649,732 | 7/1997 | Jordan et al. | 414/537 X |
| 5,938,397 | 8/1999 | Schouest | 414/537 |
| 5,988,973 | 11/1999 | Plantinga et al | 414/537 |

FOREIGN PATENT DOCUMENTS 732084  6/1995  United Kingdom ................... 414/537

*Primary Examiner*—Steven A. Bratlie
*Attorney, Agent, or Firm*—Murray E. Thrift; Adrian D. Battison

[57] ABSTRACT

A ramp is provided for use in loading and unloading truck boxes. The ramp includes a pair of parallel and spaced apart rails being connected by a plurality of track bars such that the track bars define a ramp surface. Ends of the track bars are received in respective apertures spaced along an inner side of each rail. Threaded fasteners secure the track bars in the apertures. The track bars are rigid members having a U-shaped cross section being oriented such that the ramp surface comprises a plurality of upstanding flanges. The ramp may include a pivotal coupling for folding the ramp in half.

14 Claims, 3 Drawing Sheets

TRUCK BOX RAMP

FIELD OF THE INVENTION

This invention relates to a ramp for use with truck boxes and more particularly to a kit of parts for assembly into a ramp structure.

BACKGROUND

When loading large and heavy obstacles into a truck box of a conventional pick up truck, it is common practice to use a ramp to extend from the ground up to the truck box. Known ramps generally include large bulky panels which are awkward in shape and size for shipping.

U.S. Pat. No. 5,645,394 to Hays describes a ramp which can be used for loading a truck box. The ramp includes upper and lower ramp sections which are hinged together such that the ramp is collapsible for storage. Each ramp section however comprises a large panel of steel which requires a significant amount of storage space for distributors who ship the ramp and for retailers who stock the ramp on their shelves.

SUMMARY

According to one aspect of the present invention there is provided a kit of parts for assembly into a ramp structure, the kit comprising;

a pair of elongate rails, each rail having a plurality of apertures spaced along a side thereof;

a plurality of track bars having ends which are formed to be slidably received within the apertures of the respective rails; and fastening means for securing opposite ends of each track bar within corresponding apertures in the respective rails such that the track bars form a ramp surface of the ramp structure when the track bars are secured within the corresponding apertures of the rails.

The use of rails and track bars which can be fastened together provides a simple structure which can be shipped as a kit of small parts and assembled by consumers using conventional tools. The compact packaging reduces shipping costs and retail space requirements while resulting in a convenient product for use by consumers. The rails and track bars are rigid members formed from standard cutting and forming sheet metal techniques such that the resulting ramp structure is strong and resistant to bending despite being assembled from numerous smaller parts. If the ramp is damaged, the affected parts can be easily replaced by the customer with standard tools, without having to ship the entire ramp back to the factory.

Each rail is preferably a U-shaped channel defining a pair of parallel and spaced apart flanges, the apertures being located in one flange such that the other flange defines an end surface for engaging ends of the track bars.

The apertures may be located adjacent a top side of the rails, the top side being connected between the opposing flanges such that the track bars are substantially flush with the top side of the rails when the track bars are secured within the corresponding apertures.

The track bars are preferably rigid members having a U-shaped cross section. When the track bars are U-shaped in cross section the apertures are elongate slots such that the apertures engage a top and bottom side of the respective track bars when the track bars are inserted into the respective apertures.

A plurality of first mounting apertures are preferably spaced along the rails and a plurality of second mounting apertures are preferably located in the respective ends of the track bars, the corresponding first and second mounting apertures being aligned when the track bars are inserted into the respective apertures.

When assembled, the track may be a fold up unit with each rail comprising an upper section, a lower section and a coupling for mounting the upper and lower sections together for pivotal movement therebetween.

Each rail may include an upper curved portion, the upper curved portion being arranged to extend generally forward when the rail extends upward at a forward incline.

According to a further aspect of the present invention there is provided a ramp structure comprising;

a pair of parallel and spaced apart rails, each rail having a plurality of apertures spaced along an inner side thereof;

a plurality of track bars having ends which are mounted within the apertures of the respective rails; and fastening means for securing opposite ends of each track bar within corresponding apertures in the respective rails such that the track bars form a ramp surface when the track bars are secured within the corresponding apertures of the rails.

Each rail is preferably a U-shaped channel defining a pair of parallel and spaced apart flanges, the apertures being located in one flange such that the other flange defines an end surface for engaging ends of the track bars.

The rails are preferably oriented such that a top side is connected between the pair of flanges and the flanges extend downward from the top side such that the top side defines a portion of the ramp surface.

The apertures are preferably located adjacent a top side of the rails, the top side being connected between the opposing flanges such that the track bars are substantially flush with the top side of the rails when the track bars are secured within the corresponding apertures.

The track bars are preferably rigid members having a U-shaped cross section defining a pair of parallel and spaced apart flanges. In this arrangement, the track bars are preferably oriented such that the flanges extend generally upward from a bottom side connected between the flanges such that the ramp surface comprises a plurality of upstanding flanges.

The apertures are preferably elongate slots such that the apertures engage a top and bottom side of the respective track bars when the track bars are inserted into the respective apertures.

There may be provided a plurality of first mounting apertures spaced along the rails and a plurality of second mounting apertures in the respective ends of the track bars, the corresponding first and second mounting apertures being aligned when the track bars are inserted into the respective apertures.

Each rail may comprise an upper section, a lower section and a coupling for mounting the upper and lower sections together for pivotal movement therebetween.

Additionally, each rail may include an upper curved portion, the upper curved portion being arranged to extend generally forward when the rail extends upward at a forward inline.

BRIEF DESCRIPTION OF THE DRAWINGS

In the accompanying drawings, which illustrate an exemplary embodiment of the present invention.

DETAILED DESCRIPTION

Figure 1:
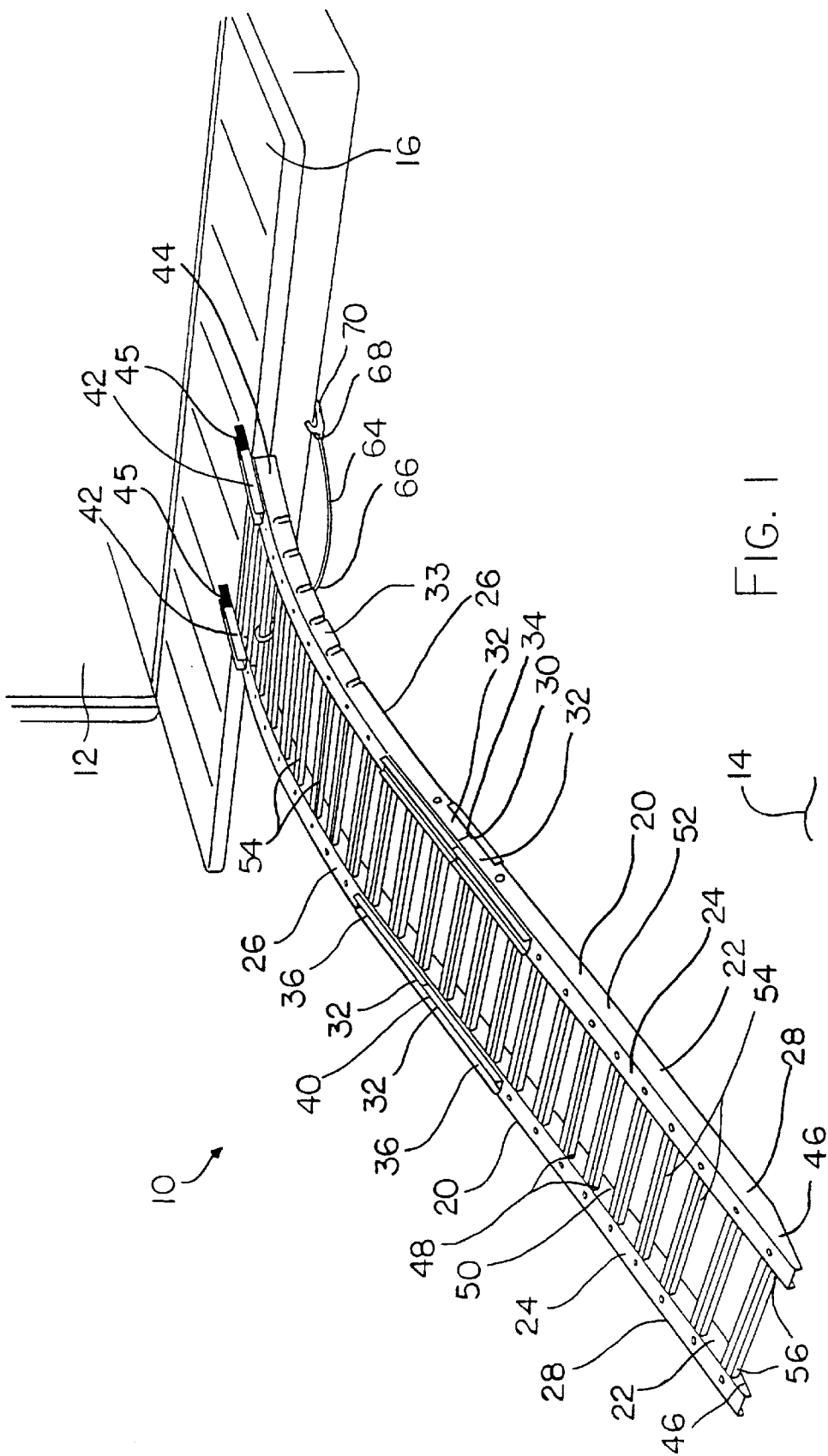
FIG. 1 is an isometric view of the ramp shown supported at one end on a truck box.

Referring to the accompanying drawings, there is illustrated a ramp generally indicated by reference numeral 10. The ramp 10 is for use with a truck box 12 of a conventional pick up truck. The ramp 10 extends from the ground 14 to the tail gate 16 of the truck for loading and unloading cargo from the truck box.

The ramp 10 includes a pair of rails 20 which are mounted parallel and spaced apart. Each rail is an elongate channel member having a U-shaped cross section being oriented such that side flanges 22 extend downward from respective sides of a top side 24.

The rails 20 each include an upper section 26 and a lower section 28. The upper and lower sections are coupled by a link 30 which is pivotally mounted at ends on the upper and lower sections respectively at respective positions spaced from the corresponding inner ends 32 of the rails. The lower sections are substantially flat while the upper section includes a curved portion 33 towards a top end. The curved portion 33 extends in a forward direction when the ramp is positioned to extend upward and forward such that the ramp surface gradually curves towards the substantially horizontal surface of the truck box.

The link 30 is a U-shaped member which fits within the channel of the rails and includes support flanges 34 which extend around a bottom edge of the side flanges 22 of the rails for supporting the upper and lower rail sections in an extended position as shown in FIG. 1. In the extended position the upper and lower section of the rails are substantially co-linear along portions of the rail adjacent the respective inner ends 32. The link 30 is pivotal at its ends about respective bolts which extend horizontally through the rails for mounting the links thereon.

A brace member 36 is mounted on the top side 24 of each rail adjacent the respective inner ends 32 of each section. The brace members 36 have a U-shaped cross section and are mounted on the rails such that side flanges 38 of the members extend upward. Respective inner ends 40 of the brace members 36 are mounted flush with the inner ends 32 of the rails sections such that in the extended position the inner ends 32 of the rails engage each other while the inner ends 40 of the brace members also engage each other on each respective rail. The brace members 36 are mounted on the rails using bolts.

A finger 42 is mounted on the top side 24 of each rail adjacent a top end 44 of the rail. The fingers 42 are bolted onto the respective rails to extend outward past the respective top ends 44 of the rails. The finger 42 is a rigid bar which includes a rubber coating 45 on an outer end thereof for gripping onto the gate 16 of a truck.

A bottom end 46 of each rail 20 is tapered such that the side flanges 22 extend from the top side 24 at an incline adjacent the bottom end 46. In this arrangement the top side 24 of the rail 20 is substantially adjacent the ground when the rails are positioned to extend upwardly from the ground at an incline in use.

A plurality of sockets 48 are spaced along an inner side 50 of each rail 20. The sockets 48 are elongate slotted apertures being generally rectangular in shape and having rounded ends. The sockets 48 can be formed with conventional sheet metal punching tools. The apertures are located in the corresponding side flange 22 of each rail, adjacent the top side 24 of the rail such that the side flanges 22 on the outer sides 52 of each rail define an end surface of the sockets. The sockets 48 of one rail are in alignment with corresponding sockets of the other rail.

The sockets 48 are arranged to receive track bars 54 therein such that the track bars extend between the rails and form a ramp surface. The track bars 54 have a U-shaped cross section and fit in the sockets 48 with minimal clearance therebetween such that the track bars engage the sockets along a top and bottom side of the bars to resist twisting of the bars within the respective sockets. The track bars 54 are inserted at ends 56 into the sockets 48 in the respective rails such that the ends of the track bars engage the end surface of the sockets.

The track bars 54 are oriented such that the sides of the U-shaped cross section extend generally upward from the base of the bars. In this arrangement the ramp surface formed by the track bars comprises a plurality of spaced apart upstanding flanges for added traction. The track bars are substantially flush with the top side 24 of the rails due to the location of the sockets 48 such that the ramp surface is substantially level.

The track bars 54 include mounting apertures 58 adjacent each end 56 thereof. The apertures 58 are in alignment with mounting apertures 60 in the top side of the rails when the ends of the track bars are inserted into the respective sockets. Bolts 62 extend through the co-operating apertures 58 and 60 for securing the track bars in the respective sockets.

A safety cable 64 is provided for preventing the ramp from slipping off of the gate 16 of the truck box when in use. The safety cable 64 is looped at a first end 66 for connecting to one of the track bars near the top end of the rails. A second end 68 of the safety cable includes a hook 70 mounted thereon for engaging a portion of the truck. The hook 70 is mounted on the truck in a conventional manner such that the fingers 42 remain engaged on a top side of the gate for securably supporting the ramp on the gate.

The use of the mounting apertures 58 and 60 in each of the track bars and the rails allows the ramp to be easily assembled using minimal tools. The ramp is thus ideal for shipment by distributors as a kit of parts which can be easily assembled by consumers using conventional hand tools. If the ramp is damaged, the affected parts can be easily replaced by the customer with standard tools, without having to ship the entire ramp back to the factory.

Figure 2:
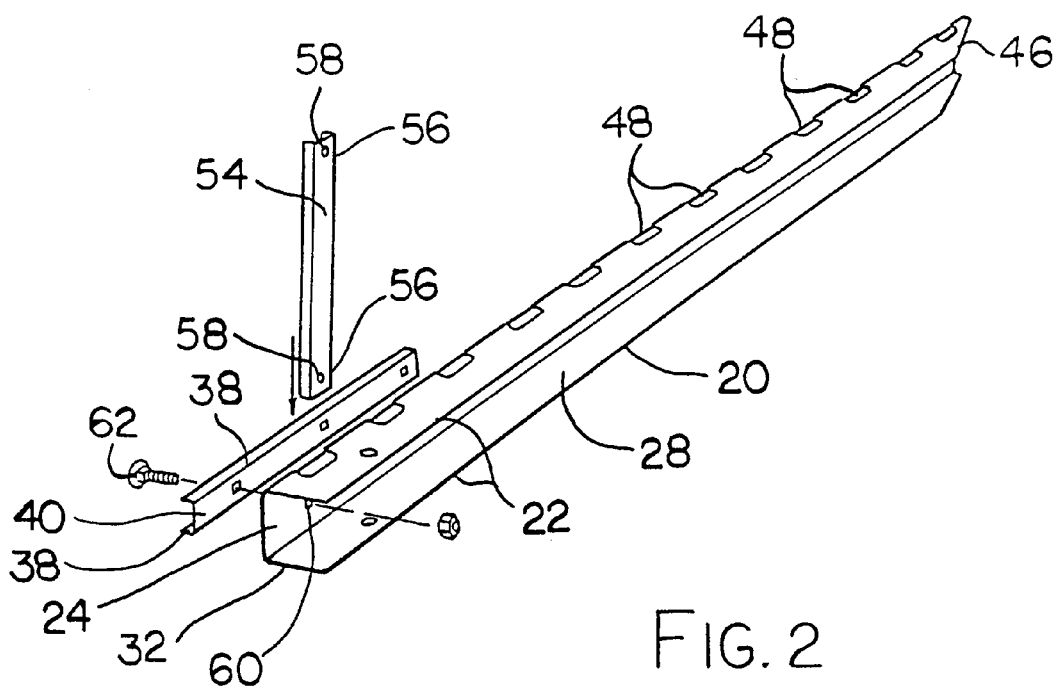
FIG. 2 is an isometric view showing how each track bar mounts on a first one of the rails.

When assembling the ramp, the track bars are inserted in both the upper and lower sections of one rail. The track bars are oriented as described above and inserted into the respective sockets until the ends of the bars engage the bottom surface of the sockets such that the apertures 58 and 60 are aligned. The brace members 36 and the fingers 42 are positioned on the top side of the rails in their respective positions such that apertures in the brace members 36 and the fingers 42 are aligned with the apertures 58 and 60. In this arrangement, the brace members and fingers are mounted onto the rails using the same bolts as the track members as demonstrated in FIG. 2 wherein a brace member is shown as it would be mounted on a lower section of a rail.

Figure 3:
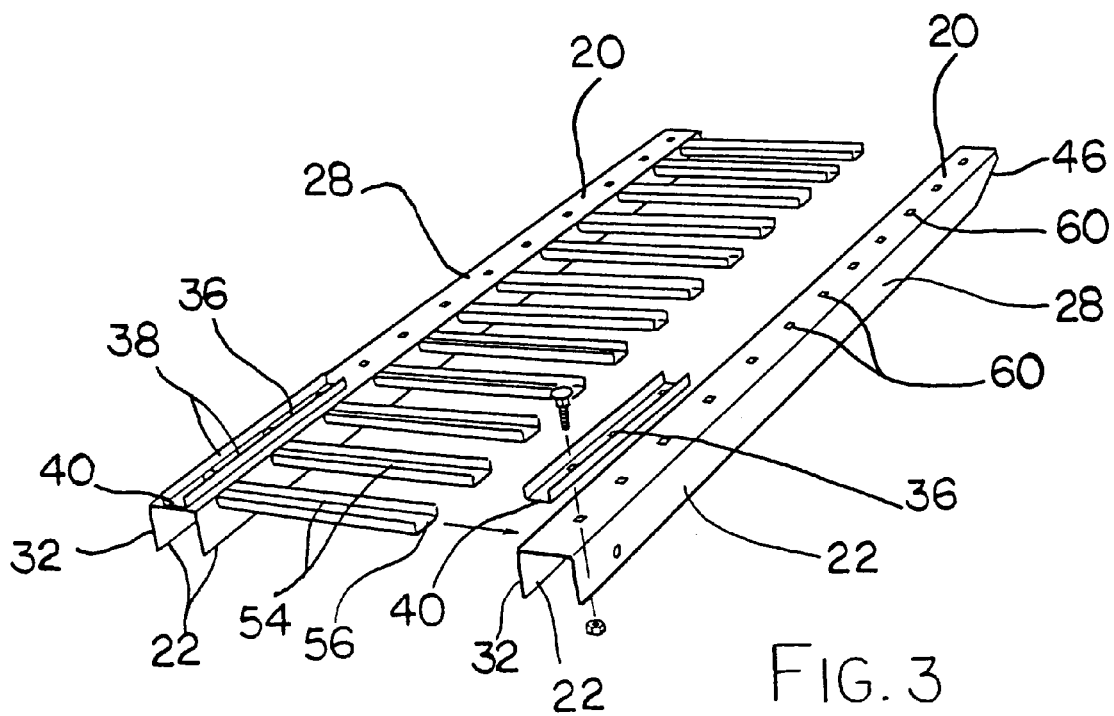
FIG. 3 is an isometric view showing how a second one of the rails is mounted on the track bars.

Once all of the track bars have been mounted at one end on one of the rails, the sockets of the other rail are aligned with the respective track bars and the track bars are inserted into the other rail in unison as demonstrated in FIG. 3. The brace members and the fingers are similarly arranged for receiving the bolts therethrough as described above for securing the track bars as well as the brace members and fingers in place.

Figure 4:
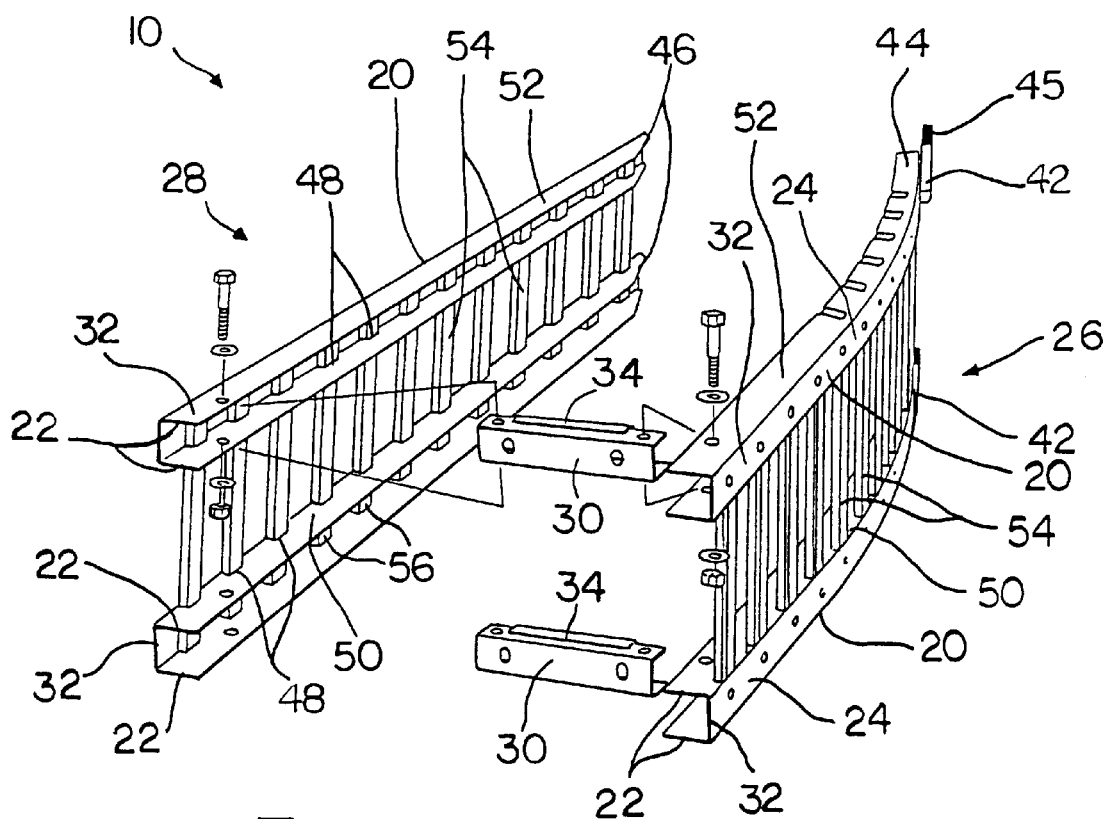
FIG. 4 is an isometric view showing how the upper and lower ramp sections are coupled together.

Finally the upper and lower ramp sections are connected by bolting the links 30 in place as shown in FIG. 4. The ramp may thus be compacted by folding it in half without disassembly. When shipping or storing the ramp for long term it may be worthwhile to remove all of the bolts for completely disassembling the ramp as desired.

In further arrangements, the ramps 10 may be assembled in a single section rather than an upper section and a lower section as described above. The single section would include a pair of rails similar to those described having a tapered bottom end and a support finger at a top end for gripping the truck box. The single section is preferable for shorter ramps which do not require the curved upper portion of the rails.

In either arrangement, the use of rails and track bars being formed from U-shaped channels provides a strong structure which is formed of numerous small parts which are easily stored and shipped. The U-shaped channels are easy to manufacture using standard sheet metal cutting and folding techniques. The apertures are formed using standard techniques for punching and cutting the sheet metal. The resulting kit of parts of rails and track bars is very compact for transport in comparison to convention solid panel ramps.

While one embodiment of the present invention has been described in the foregoing, it is to be understood that other embodiments are possible within the scope of the invention. The invention is to be considered limited solely by the scope of the appended claims.

What is claimed is:

1. A kit of parts for assembly into a ramp structure, the kit comprising;
    a pair of elongate rails, each rail having a pair of parallel and spaced apart side walls and a plurality of apertures spaced longitudinally along one side wall thereof;
    a plurality of track bars having ends which are formed to be slidably and non-rotatably received within the apertures of the respective rails such that the track bars are supported at respective ends directly on the rails; and
    a plurality of fasteners arranged to extend through the respective ends of the track bars and the corresponding rails for securing opposite ends of each track bar within corresponding apertures in the respective rails such that the track bars form a ramp surface of the ramp structure when the track bars are secured within the corresponding apertures of the rails.

2. The kit according to claim 1 wherein each rail is U-shaped channel having a base extending between the respective side walls of the rail such that the side walls define a pair of flanges, the apertures being located in one flange such that the other flange defines an end surface for engaging ends of the track bars.

3. The kit according to claim 2 wherein the apertures are located in the corresponding side wall adjacent the base of the rails such that the track bars are substantially flush with the base of the rails when the track bars are secured within the corresponding apertures.

4. The kit according to claim 1 wherein the track bars are rigid members having a U-shaped cross section comprising a flat base member connected between a pair of upstanding flanges.

5. The kit according to claim 4 wherein the apertures comprise substantially rectangular slots such that the apertures engage a top and bottom side of the respective track bars when the track bars are inserted into the respective apertures with minimal clearance therebetween.

6. The kit according to claim 2 wherein there is provided a plurality of first mounting apertures spaced along the respective bases of the rails and a plurality of second mounting apertures in the respective ends of the track bars, the corresponding first and second mounting apertures being aligned when the track bars are inserted into the respective apertures for receiving the fasteners therethrough.

7. A ramp structure comprising;
    a pair of parallel and spaced apart rails, each rail having an inner side wall and an outer side wall mounted parallel and spaced apart and a plurality of apertures spaced longitudinally along the inner side wall thereof;
    a plurality of track bars having ends which are slidably and non-rotatably mounted within the apertures of the respective rails such that the track bars are supported at respective ends directly on the rails; and
    a plurality of fasteners extending through the respective ends of the track bars and the corresponding rails for securing opposite ends of each track bar within corresponding apertures in the respective rails such that the track bars form a ramp surface when the track bars are secured within the corresponding apertures of the rails.

8. The ramp structure according to claim 7 wherein each rail is U-shaped channel having a base extending between the respective side walls of the rail such that the side walls define a pair of flanges, the apertures being located in one flange such that the other flange defines an end surface for engaging ends of the track bars.

9. The ramp structure according to claim 8 wherein the base member of each rail is connected between a top side of the respective pair of flanges and the flanges extend downward from the top side such that the top side defines a portion of the ramp surface.

10. The ramp structure according to claim 9 wherein the apertures are located adjacent the top side such that the track bars are substantially flush with the top side of the rails when the track bars are secured within the corresponding apertures.

11. The ramp structure according to claim 8 wherein there is provided a plurality of first mounting apertures spaced along the respective bases of the rails and a plurality of second mounting apertures in the respective ends of the track bars, the corresponding first and second mounting apertures being aligned when the track bars are inserted into the respective apertures for receiving the fasteners therethrough.

12. The ramp structure according to claim 7 wherein the track bars are rigid members having a U-shaped cross section comprising a flat base and a pair of parallel and spaced apart flanges mounted thereon.

13. The ramp structure according to claim 12 wherein the track bars are oriented such that the flanges extend generally upward from the flat base connected between the flanges such that the ramp surface comprises a plurality of spaced apart upstanding flanges.

14. The ramp structure according to claim 12 wherein the apertures are substantially rectangular in shape such that the apertures engage a top and bottom side of the respective track bars when the track bars are inserted into the respective apertures with minimal clearance therebetween.

* * * * *